United States Patent
Käll et al.

(10) Patent No.: US 6,584,931 B1
(45) Date of Patent: Jul. 1, 2003

(54) SYSTEM AND METHOD FOR CONTROLLING AND MONITORING THE OPERATION OF AN AUTOMATIC MILKING SYSTEM

(75) Inventors: Lars Käll, Stockholm (SE); Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/069,870

(22) PCT Filed: Sep. 1, 2000

(86) PCT No.: PCT/SE00/01684

§ 371 (c)(1),
(2), (4) Date: Mar. 1, 2002

(87) PCT Pub. No.: WO01/15518

PCT Pub. Date: Mar. 8, 2001

(30) Foreign Application Priority Data

Sep. 2, 1999 (SE) ............................................... 9903104

(51) Int. Cl.⁷ .................................................. A01J 5/007
(52) U.S. Cl. ................................. 119/14.02; 119/14.01; 119/14.08; 119/14.14
(58) Field of Search ........................... 119/14.01, 14.02, 119/14.08, 14.14–14.17; 704/258

(56) References Cited

U.S. PATENT DOCUMENTS

| | | | | |
|---|---|---|---|---|
| 4,773,008 A | * | 9/1988 | Schroeder et al. | ........... 119/245 |
| 4,922,855 A | * | 5/1990 | Tomizawa et al. | ....... 119/14.08 |
| 5,228,112 A | * | 7/1993 | Lemelson | ................... 348/441 |
| 5,581,630 A | * | 12/1996 | Bonneau, Jr. | ................ 235/380 |
| 5,704,311 A | * | 1/1998 | van den Berg | .......... 119/14.02 |
| 5,878,692 A | | 3/1999 | Ornerfors | |
| 5,996,529 A | * | 12/1999 | Sissom et al. | ........... 119/14.14 |
| 6,089,242 A | * | 7/2000 | Buck | ........................ 119/14.18 |

FOREIGN PATENT DOCUMENTS

| | | |
|---|---|---|
| DE | 33 27 809 A1 | 2/1985 |
| DE | 19732957 | 11/1998 |
| JP | 11-089466 | 4/1999 |
| WO | WO 200113709 A1 * | 3/2001 |

OTHER PUBLICATIONS

RD 423029 A Jul. 1999.*

* cited by examiner

Primary Examiner—Charles T. Jordan
Assistant Examiner—Tara M Golba
(74) Attorney, Agent, or Firm—Birch, Stewart, Kolasch & Birch, LLP

(57) ABSTRACT

A system and method for controlling and monitoring the operation of an automatic milking system (1), wherein a central processing unit (8) is arranged to receive signals from peripheral hardware units (3, 4, 5, 6, 7, R) and to process the signals for obtaining hardware status related information or milking animal status related information. An interface (9, 10, 11, 12, 13) is arranged for communication between the central processing unit and an operator. The interface includes a device for understanding and interpreting vocal instructions from an operator and translating them into machine understandable instructions. The central processing unit includes a device for controlling or regulating at least one of the peripheral hardware units, or to provide status related information in vocal form as a response to said vocal instructions.

15 Claims, 2 Drawing Sheets

SYSTEM AND METHOD FOR CONTROLLING AND MONITORING THE OPERATION OF AN AUTOMATIC MILKING SYSTEM

This application is the national phase under 35 U.S.C. §371 of PCT International Application No. PCT/SE00/01684 which has an International filing date of Sep. 1, 2000, which designated the United States of America and was published in English.

TECHNICAL FIELD OF THE INVENTION

This invention concerns a system and a method according to the preambles of claims 1 and 8, respectively.

DESCRIPTION OF PRIOR ART

Automatic milking systems allow the milking animals in a livestock to stray around inside a stable building or in confined pastures and to visit a milking robot at virtually any time. A computer monitors the system and keeps up with individual animal status for members of the stock such as production related information, and also monitors the equipment for the detection of defects and initiates maintenance and service such as regular-washing.

In order to keep control of the equipment the farmer, or the operator, is obliged to use a specific terminal, which typically is placed in a separate computer or control room at a distance from the stable room. As an alternative a touch display may be arranged on the robot for controlling and monitoring the operation of the automatic milking system. There are, however, situations where actions from the farmer is immediately necessary, such as when there is a risk of an animal damaging a piece of equipment or when there is a risk of animal injuries. In such cases the operator has to take the time to go to the control room, log into the control program and initiate the necessary measure if computer controlled action is necessary. Otherwise the operator has to enter the animal area in order to stop or start an operation, which might be dangerous in some situations, particularly with respect to a hurt animal. In further cases it is at least time consuming and inconvenient to leave the stable building and enter the control room in order to initiate a specified action or to get access to required information.

AIM AND FEATURES OF THE INVENTION

It is an aim of the invention to provide a system and a method, which solve the prior art problems.

This is achieved in a system and a method according to the above through the features of the characterizing portions of claim 1 and 8, respectively.

This way it is possible for the farmer, or the operator, to control at least chosen parts of the system, while working inside the stable room, where clear visual contact is guaranteed and this simultaneously as the farmer is occupied with other work such as animal or building care, equipment servicing or the like. The invention provides a rational and safe solution to the prior art problems. In particular it is made possible for the farmer to have the computer in one place, be occupied by and continue working at a second place and be able to control the operation of equipment positioned at further places.

If information is requested the operator is informed accordingly in a vocal form, also enhancing the flexibility of the system.

The interface means may be of a per se known kind including microphone means, signal cables, voice interpreting software means, instruction programming, comparing and transmission means, loudspeaker means etc.

By the system including means allowing programming of vocal instructions from a specific operator, the system is thought to unequivocally understand instructions from a specific farmer irrespective of his voice, his language or his regional accent. Preferably the system allows programming by a number of operators, each for example being given a personal code for entry into the system.

In this connection it could be mentioned that the system is preferably set in a standby mode until it is activated by a specific code such as a spoken word or, simply by one of a number of chosen vocal instructions or by pressing a button or by typing a command.

In a confined area it is expedient to provide one or more stationary microphones, but operator-based microphones allow more freedom for the operator with respect to location and talking direction.

It is preferred that the system also is taught to act as a response to animals sounds, for example, at a certain chosen sound level in order to avoid damage to equipment and/or animal injuries. It is envisaged that in a system according to the invention, the system may be taught to interpret animal sound in a way similar to what will be described later with respect to human vocal instructions.

BRIEF DESCRIPTION OF THE DRAWINGS

The invention will now be explained further at the background of an embodiment and with reference to the annexed drawings, wherein.

DESCRIPTION OF AN EMBODIMENT

Figure 1:
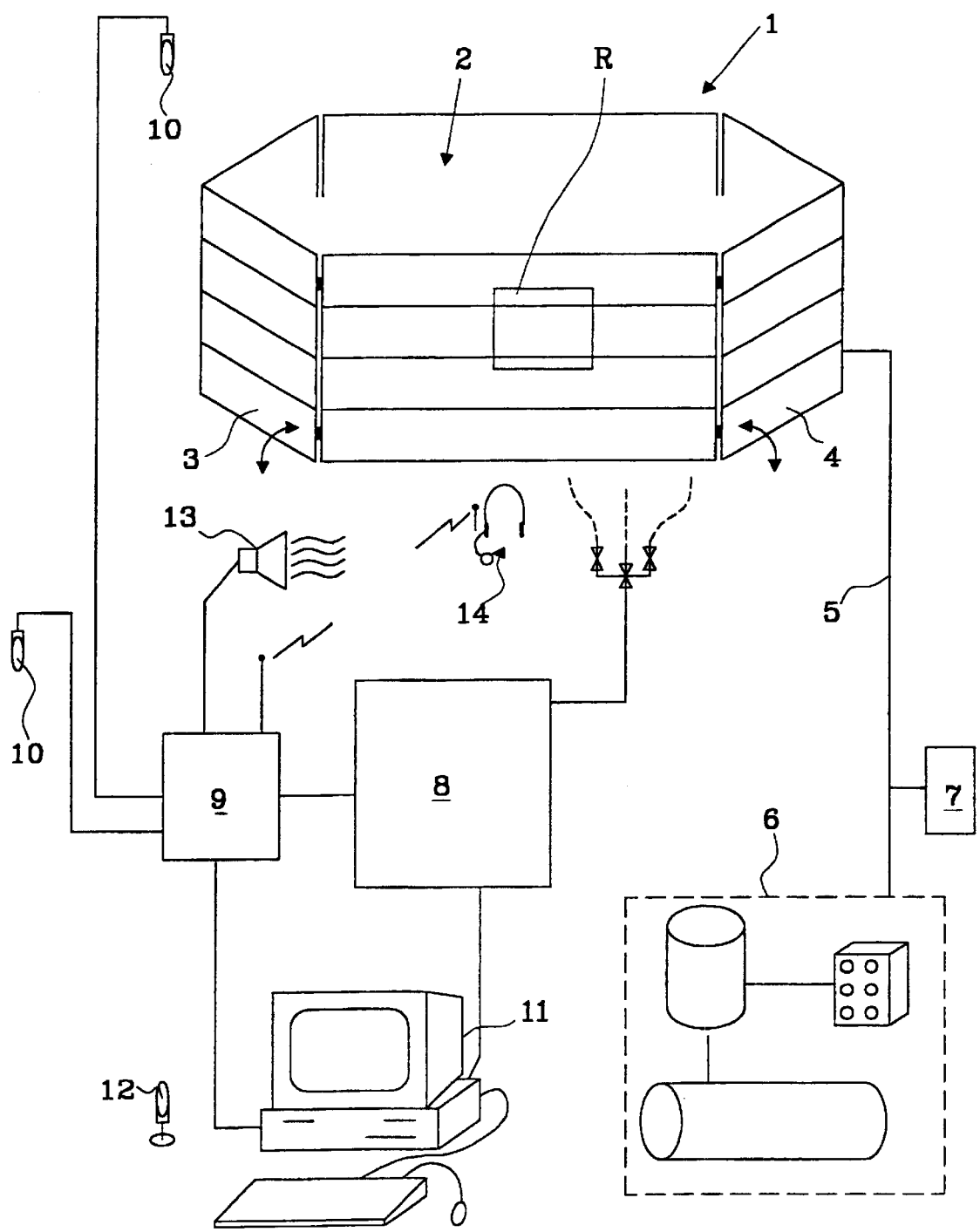
FIG. 1 diagrammatically shows the layout of an automatic milking equipment including a system according to the invention.

In FIG. 1 reference sign 1 denotes an automatic milking device confining a milking area 2 and including an entry gate 3 and an exit gate 4 for milking animals such as cows. Inside the milking area, as usual, a milking robot R is arranged to find the teats of a cow and to milk said cow, when inside the milking area 2. A milk transport tube 5 transports the milk from the milking robot to a milk handling station, generally designated with 6, which as usual includes a pump, filters, flow detector devices, a tank etc. 7 designates washing equipment for the system. The system is controlled by a central processing unit 8, which communicates with the above mentioned equipment and with motors for operating the gates 3 and 4 and the milking robot R. An interface means 9 is connected to the central processing unit 8 and is arranged to communicate with an operator such as a farmer over microphones 10, which in this case are stationary microphones, or over portable operator based microphones via a per se known antenna system. 14 denotes a head-set including a portable microphone and loudspeaker. A terminal 11 is connected to the central processing unit for programming and conventional controlling and monitoring purposes.

The inventions allow hardware control by the operator from an optional position in the neighbourhood of the milking robot. Actions taken may be: close entry gate, let out animal from the milking area, open gate, wash system, move away robot etc.

In order to introduce an operator into the system, he simply has to establish a table of instructions over a microphone, which may be a separate microphone 12 placed adjacent to the terminal 11. He thus records a set of vocal instructions and connects each vocal instruction with one intended action as provided by the central processing unit and as taken from a pre-prepared table of machine instructions. Finally he enters that chosen intended action on the terminal 11 so as to match it with the corresponding vocal instruction.

It is not excluded that the operator creates new machine instructions and connects these with corresponding vocal instructions.

Preferably each operator being introduced into the system is given a personal code for activating his personal table of instructions. This code is preferably a spoken word and may as an example be the name of the operator.

It is also envisaged that the operator may be entered into the system without previous pre-programming. In such cases the operator should be careful to express himself accordingly in order to enable the interface means to correctly interpret his vocal instructions.

Figure 2:
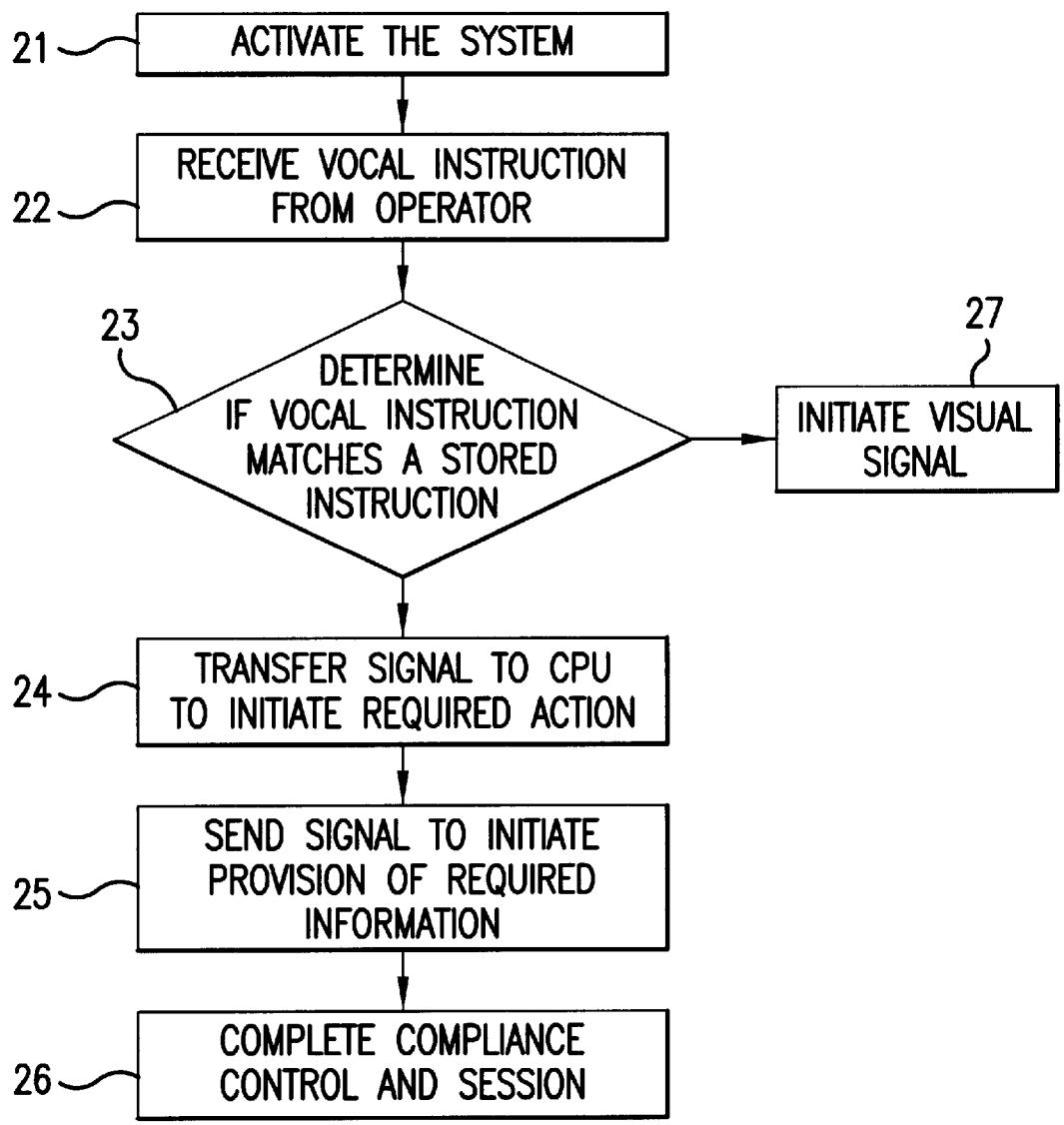
FIG. 2 shows a flow chart illustrating a method according to the invention.

In FIG. 2 the invention is further explained at the background of a flow chart, where position 21 denotes activation of the system and start of the session by the system recognising a valid operator code. Box 22 denotes the reception of a vocal instruction from the operator and box 23 the system comparing this vocal instruction with the stored table of instructions belonging to the specific operator.

If the system is able to establish that there is correspondence between the vocal instruction and one item of the stored table of instructions, the system goes to box 24, otherwise the session is interrupted and a signal such as a sound or a visual signal is initiated at 27. In box 24 a signal is transferred to the central processing unit to initiate the required action and in box 25 provision is made by the central processing unit to send the relevant hardware control signal or a signal for initiating provision of required information. Such information may for example be information about when a cow was previously milked, production figures for a specific cow, which cow is being presently subjected to milking. Further, information that might be required, is status information with respect to animals and hardware and function test information for the system or for a specific piece of equipment. Other information which is stored in the memory of the central processing unit may also be available this way and preferably the information is issued to the operator by a synthetic voice through a loudspeaker 13 which is placed at a convenient place somewhere in the stable building. As an alternative a loudspeaker and a microphone may be comprised in the head-set 14 (FIG. 1), which is carried by the operator. Finally, compliance control with respect to the required action is carried out at 26, which also denotes the end of the session.

It is important to somewhat understand the farmer working conditions prevailing in a stable and in like buildings where automatic milking systems are installed. The environment is such that action often needs to be taken at various distant places, which tend to risk putting a high stress level on the operator. Any delay of action also increases the risk for damages on equipment or injuries to animals. The risk of personal injuries when handling milking animals is by the way not to be neglected. Further, the atmosphere is not suitable for other than very robust equipment. The invention therefore is a valuable solution to above mentioned problems in that increased safety is introduced on more than one level and that this is obtained without introducing sensitive equipment in a rather hostile environment.

The invention may be modified within the scope of the following claims and it is understood that the interface means 9 in some cases may be a part of the central processing unit 8 instead of being a separate unit. It may also be include in the robot computor.

The system may well be used with respect to animals straying around in pasturelands. In that case the automatic milking equipment 1 is likely to be placed inside a building being accessible to the straying animals.

What is claimed is:

1. A system for controlling and monitoring the operation of an automatic milking system (1), wherein milking animals are allowed to enter, in order to be milked, a milking area (2) at will, and wherein a central processing unit (8) is arranged to receive signals from peripheral hardware units (3, 4, 5, 6, 7, R) and to process the signals for obtaining hardware status related information or milking animal status related information, and wherein an interface (9, 10, 11, 12, 13) is arranged for communication between the central processing unit and an operator, wherein the interface (9, 10, 11, 12, 13) includes means for understanding and interpreting vocal instructions from the operator given by the operator directly inside a stable room including the milking area, and for translating said vocal instructions into machine understandable instructions, and the central processing unit (8) includes means for controlling or regulating at least one of said peripheral hardware units (3, 4, 5, 6, 7, R), or for providing status related information in vocal form as a response to said vocal instructions.

2. System according to claim 1, wherein the central processing unit (8) includes programming means for programming a memory with a set of vocal instructions from a specific operator in order to enhance interpretation.

3. System according to claim 1, wherein the interface (9, 10, 11, 12, 13) includes at least one stationary microphone (10).

4. System according to claim 1, wherein the interface (9, 10, 11, 12, 13) includes at least one operator-based microphone (14).

5. System according to claim 1, wherein the vocal instructions include any instruction of the group: end milking sequence, remove milking robot (R) from animal, open gate (3, 4), close gate (3, 4), release animal, initiate washing (7) of equipment, provide production information for a specific animal, provide milking period information for a specific animal, provide information about animal presently being subjected to milking, provide specified hardware status information, provide function test information for specified piece of equipment.

6. System according to claim 1, wherein the interface (9, 10, 11, 12, 13) is also arranged to recognise animal sounds, so that a certain predetermined sound level will result in terminating at least one action, including moving a device, opening a gate (3,4), and releasing an animal.

7. System according to claim 1, wherein the hardware units (3,4,5,6,7,R) include a milking robot (R), milking area entry and exit gates (3,4), milk flow measuring means, washing means (7) and means for controlling milk quality.

8. A method for controlling and monitoring the operation of an automatic milking system (1), comprising: allowing milking animals to enter a milking area (2) and to be milked, at will, wherein, and wherein a central processing unit (8) receives signals from peripheral hardware units (3, 4, 5, 6, 7, R), and processes the signals for obtaining hardware status related information or milking animal status related information, and wherein an operator communicates with the central processing unit (8) over an interface (9, 10, 11,

12, 13), vocal instructions from the operator given by the operator directly inside a stable room including the milking area, are received and translated into machine understandable instructions, and the central processing unit (8) controls or regulates at least one of said peripheral hardware units (3, 4, 5, 6, 7, R), or provides status related information in vocal form as a response to said vocal instructions.

9. Method according to claim 8, wherein a memory in the central processing unit (8) is programmed with a set of vocal instructions from a specific operator in order to enhance interpretation.

10. Method according to claim 8, wherein the operator communicates with the interface (9,10,11,12,13) over at least one stationary microphone (10).

11. Method according to claim 8, wherein the operator communicates with the interface (9, 10, 11, 12, 13) over at least one operator-based microphone (14).

12. Method according to claim 8, wherein the vocal instructions are selected to be any instruction of the group: end milking sequence, remove milking robot (R) from animal, open gate (3, 4), close gate (3, 4), release animal, initiate washing (7) of equipment, provide production information for a specific animal, provide milking period information for a specific animal, provide information about animal presently being subjected to milking, provide specified hardware status information, provide function test information for specified piece of equipment.

13. Method according to claim 8, wherein the interface (9, 10, 11, 12, 13) also recognises animal sounds, so that a certain predetermined sound level will result in terminating at least one action, including moving a device, opening a gate (3,4), and releasing an animal.

14. Method according to claim 8, wherein the hardware units (3, 4, 5, 6, 7, R) are selected to be any of the group: a milking robot (R), milking area entry and exit gates (3, 4), milk flow measuring means, washing means (7) and means for controlling milk quality.

15. An automatic milking system including a system for controlling and monitoring according to claim 1.

* * * * *